United States Patent
Lee et al.

(10) Patent No.: US 7,504,273 B2
(45) Date of Patent: Mar. 17, 2009

(54) SCRIBING METHOD AND APPARATUS OF LIQUID CRYSTAL PANEL, METHOD FOR FABRICATING LIQUID CRYSTAL PANEL

(75) Inventors: Dong-woo Lee, Seoul (KR); Seong-woon Booh, Yongin-si (KR); Jin-woo Cho, Seongnam-si (KR); Ki-taek Kim, Yongin-si (KR); Dong-ok Kwak, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 417 days.

(21) Appl. No.: 11/315,001

(22) Filed: Dec. 23, 2005

(65) Prior Publication Data
US 2006/0158601 A1    Jul. 20, 2006

(30) Foreign Application Priority Data
Jan. 20, 2005    (KR) .................... 10-2005-0005266

(51) Int. Cl.
*H01L 21/00* (2006.01)
(52) U.S. Cl. ............... 438/30; 349/43; 349/156; 349/187; 356/244
(58) Field of Classification Search ............ 438/30; 349/43, 156, 187; 356/244
See application file for complete search history.

(56) References Cited

U.S. PATENT DOCUMENTS
7,301,623 B1 * 11/2007 Madsen et al. ............... 356/244

FOREIGN PATENT DOCUMENTS

| JP | 07-230082 | 8/1995 |
|----|-----------|--------|
| JP | 2004-026539 A | 1/2004 |
| JP | 2004-223797 A | 8/2004 |
| JP | 2004354836 | 12/2004 |

\* cited by examiner

*Primary Examiner*—Walter L Lindsay, Jr.
*Assistant Examiner*—Abdulfattah Mustapha
(74) *Attorney, Agent, or Firm*—Sughrue Mion, PLLC

(57) ABSTRACT

A method for fabricating liquid crystal panel including providing a first and second substrates, attaching the first substrate to the second substrate with a predetermined gap, fixing the attached first and second substrates in a state bent into the predetermined radius of curvature such that tension can be applied to a predetermined cutting surface of the first substrate, forming a crack on the predetermined cutting surface using a scribing wheel, cutting the substrates by applying mechanical force to the first and the second substrates on which the crack is formed, and injecting liquid crystal into each of cut liquid crystal cells.

14 Claims, 3 Drawing Sheets

SCRIBING METHOD AND APPARATUS OF LIQUID CRYSTAL PANEL, METHOD FOR FABRICATING LIQUID CRYSTAL PANEL

This application claims benefit under 35 U.S.C. § 119 from Korean Patent Application No. 2005-05266, filed on Jan. 20, 2005, the entire content of which is incorporated herein by reference.

BACKGROUND OF THE INVENTION

1. Field of the Invention

The present invention relates to a fabrication of a liquid crystal panel constituting a liquid crystal display device, and particularly to a method and an apparatus of scribing a liquid crystal panel and a method of fabricating a liquid crystal panel using the same.

2. Background of the Invention

The liquid crystal display device is an apparatus which displays a desired picture by supplying a data signal based on picture information to liquid crystal cells arranged in a matrix form and controlling an optical transmission rate of the liquid crystal cells. The liquid crystal display device includes a liquid crystal panel in which liquid crystal cells of a pixel unit are arranged in the matrix form and a driving circuit for driving the liquid crystal cells.

The liquid crystal panel includes a first substrate comprising electrodes for applying electric field to liquid crystal cells, a film transistor for switching the supply of data according to each liquid crystal cell, signal lines for supplying data supplied from the exterior to liquid crystal cells; a second substrate comprising color filters; spacers for providing a constant gap between the first and second substrates; and a liquid crystal layer inserted a space provided by the spacer between the first and second substrates.

In the fabrication of the liquid crystal panel, a plurality of film transistor arrays are formed on the first substrate independently. The film transistor arrays are formed such that gate lines are orthogonal to date lines and a film transistor and a pixel electrode are formed at intersecting portions of gate lines and data lines, respectively. The first substrate is adhered to the second substrate which is formed such that a plurality of color filter arrays face the film transistor arrays. The adhered first and second substrates are cut into parts in a constant size and separated into individual unit panels.

The above cell cutting process includes a scribing process and breaking process. The above scribing process is, as shown in FIG. 1A, a process for forming a crack C on a predetermined cutting surface of a substrate 1 using a scribing wheel 2 made of a diamond material higher than a glass substrate 1 in strength. The breaking process is, as shown in FIG. 1B, a process for cutting the substrate 1 by applying a mechanical force through the use of a breaking bar 3, etc., to the substrate 1 on which the crack C is formed.

In addition, at the time of the scribing process, as shown in FIG. 2, not only median cracks (CM) which is a primary factor of substrate cutting but also lateral cracks (CL) in the perpendicular direction with respect to the median cracks CM are formed. The lateral cracks CL do not have any influence on the substrate cutting but rather it weakens strength of the cutting surface. Therefore, it is preferable for the lateral cracks not to be produced if possible.

However, the lateral cracks CL are necessarily produced at the time of scribing process such as the above, and thereby a decline in strength of the cutting surface due to this is a serious problem. As the time passes, the lateral cracks CL grow into a large size and provide a cause of moisture percolation, thereby may be a breakage cause of the liquid crystal display.

SUMMARY OF THE INVENTION

The present invention has been proposed to overcome the problems explained above and it is therefore an aspect of the present invention to provide a scribing method of a liquid crystal panel which can reduce lateral cracks.

It is another aspect of the present invention to provide a scribing apparatus which can perform efficiently the above scribing method of the liquid crystal panel.

It is further another aspect of the present invention to provide a method of fabricating a liquid crystal panel using a scribing method and apparatus that have the characteristics explained above.

To accomplish the above aspect, according to one aspect of the present invention, in a scribing method of a liquid crystal panel for forming a crack on a predetermined cutting surface of a substrate using a scribing wheel, wherein the substrate is bent into a selected radius of curvature such that tension can be applied to the predetermined cutting surface of the substrate.

According to this, under the condition that tension is applied to the predetermined cutting surface of the substrate is applied, the crack due to the scribing wheel is formed, so that than a smaller lateral crack is generated than under pressure of a scribing wheel such as in the prior art. That is, the origination of the lateral crack is remarkably reduced at the time of scribing the liquid crystal panel, thus preventing a strength decrease of the cutting surface.

According to another aspect of the present invention, there is a scribing method of a liquid crystal panel comprising the steps of: positioning a substrate on a chuck; adhering the substrate to the chuck, the substrate being bent into a selected radius of curvature such that tension can be applied to a predetermined cutting surface of the substrate; and forming a crack on the predetermined cutting surface of the substrate using a scribing wheel.

Further another aspect of the present invention may be accomplished by providing a scribing apparatus of a liquid crystal panel. The apparatus of the invention includes a chuck for fixing a substrate; and a scribing wheel disposed on an upper portion of the chuck, wherein the chuck is bent into a predetermined radius of curvature such that tension can be applied to the predetermined cutting surface. Here, the above chuck may be a vacuum chuck.

A further aspect of the present invention may be accomplished by providing a method of fabricating a liquid crystal panel. The method of the invention comprises: a scribing step of forming a crack on a predetermined cutting surface of a substrate using a scribing wheel and a breaking step of breaking the substrate by applying mechanical force to the substrate on which the crack is formed, wherein the substrate is held in a state of being bent into a predetermined radius of curvature such that tension is applied to the predetermined cutting surface at the scribing step.

According to another aspect of the present invention, there is provided a method of fabricating a liquid crystal panel comprising the steps of: providing a first and a second substrates; adhering first substrate to the second substrate with a predetermined space; fixing the adhered first and second substrates in a state bent into the predetermined radius of curvature such that tension can be applied to a predetermined cutting surface of the first substrate; forming a crack on the predetermined cutting surface using a scribing wheel; cutting the substrates by applying mechanical force to the first and the second substrates on which the crack is formed; and inserting liquid crystal into each of cut liquid crystal cells According to an embodiment of the present invention, the substrate is fixed using a vacuum chuck bent into a predetermined radius of curvature. In addition, the predetermined radius of curvature is in the range of elastic deformation of the substrate.

BRIEF DESCRIPTION OF THE DRAWINGS

The above and other aspects, features and advantages of the present invention will be apparent from the following detailed description of the exemplary embodiments of the invention in conjunction with the accompanying drawings, in which.

DETAILED DESCRIPTION OF THE EXEMPLARY EMBODIMENTS

Figure 3:
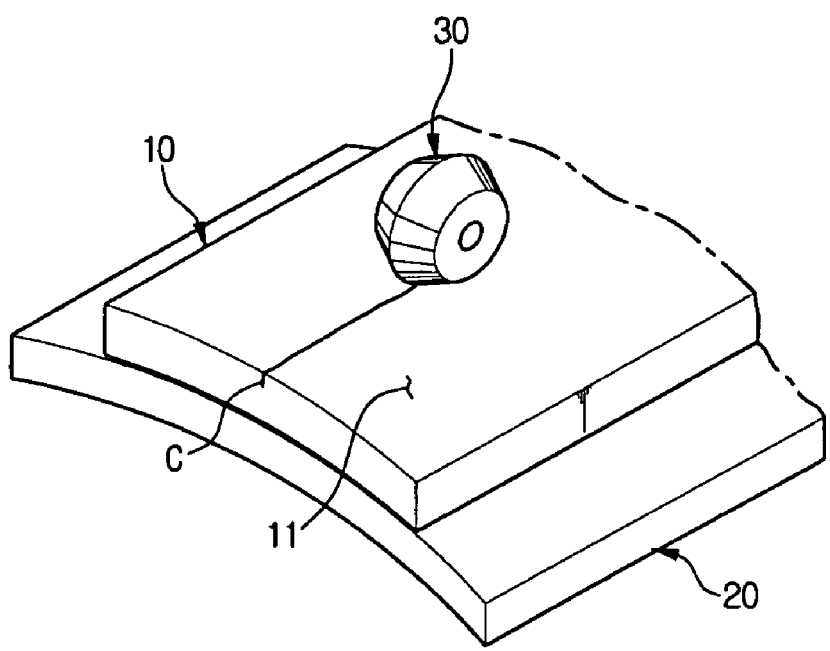
FIG. 3 is a drawing for explaining a scribing method and apparatus of a liquid crystal panel according to one embodiment of the present invention.

As shown in FIG. 3, a scribing apparatus of a liquid crystal panel according to one embodiment of the present invention comprises a vacuum chuck 20 for holding a substrate 10. The vacuum chuck 20 is bent into a selected radius of curvature. Accordingly, the substrate 10 which is fixed on the vacuum chuck 20 is also fixed in such a manner that the substrate 10 is bent according to the radius of curvature of the vacuum chuck 20. In this way, if the substrate 10 is fixed such that it is bent into the predetermined radius of curvature of the vacuum chuck 20, tension is applied to a predetermined cutting surface 11 of the substrate, thereby reducing the generation of the lateral crack at the time of the formation of a crack using a scribing wheel 30.

That is, in comparison with a scribing method for fixing a substrate to a chuck in a flat state and forming a crack using a scribing wheel in a prior art, in a scribing method of the present invention due to the predetermined cutting surface of the substrate which a predetermined tension is applied to, the generation of the crack is remarkably reduced when scribing in the same scribing wheel pressure. Therefore, the decrease of strength of the cutting surface of the substrate due to the lateral crack may be prevented.

Further, the predetermined radius of curvature of the substrate in the scribing method of the present invention may be selected from within the range of elastic deformation of the substrate at a random.

Figure 4:
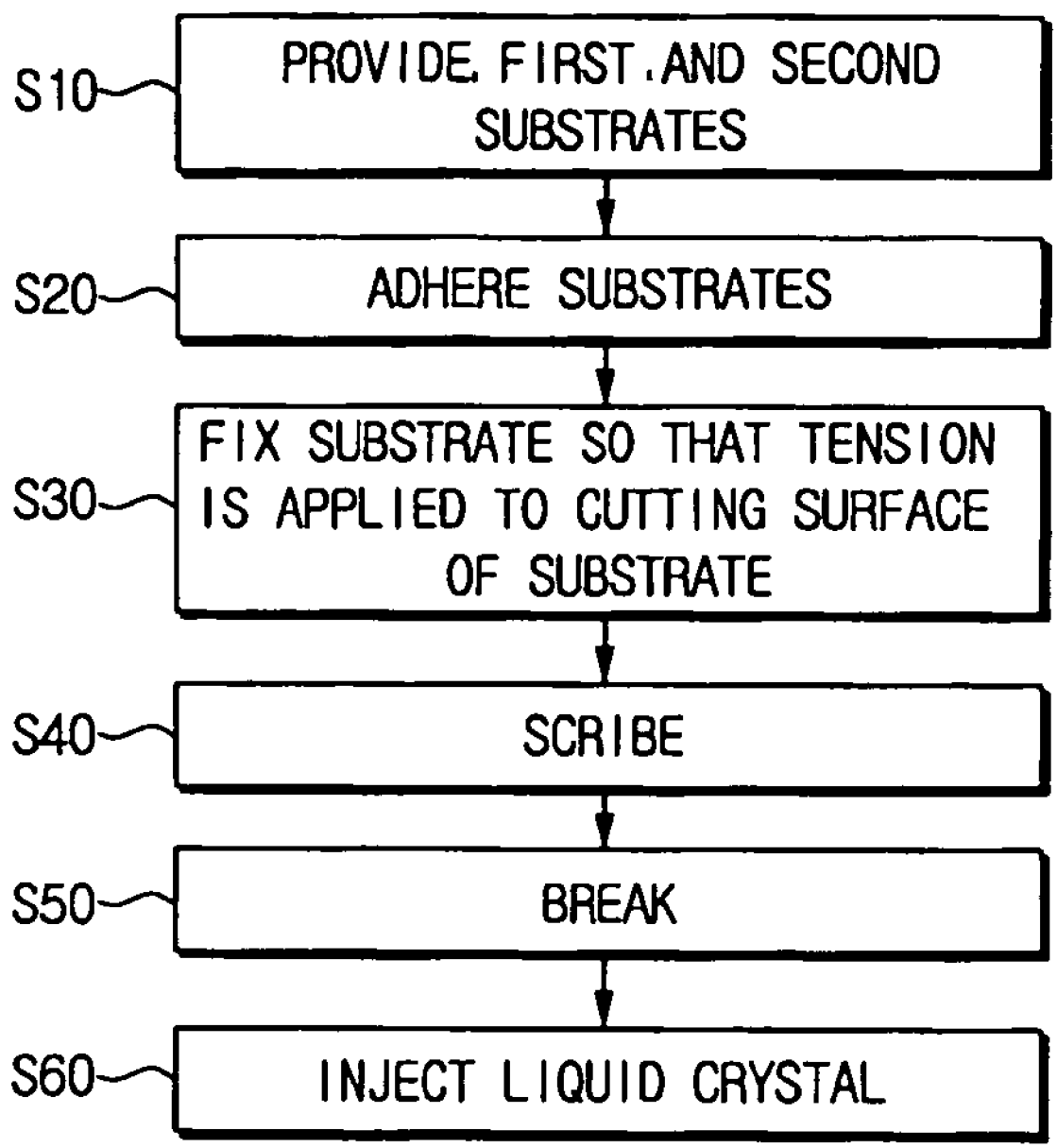
FIG. 4 is a flow chart explaining the fabrication steps according to one embodiment of the present invention.

FIG. 4 is a flow chart of fabrication processes of a liquid crystal panel using the scribing method and apparatus explained above. As shown in the drawing, a fabrication method of the liquid crystal panel of the present invention includes a step of providing first and second substrates S10; a step of adhering the first substrate to the second substrate S20; a step of fixing the adhered first and second substrates S30; a scribing step S40; a breaking step S50; and a step of inserting liquid crystal S60.

A preparation step S10 of the first and second substrates, for example, includes unit pixels, each of which has a transistor a color electrode and a storage capacitor, arranged in a matrix form on a thin film transistor array substrate, and forming a black matrix, a red, green and blue color filter and a common electrode on a color filter substrate as a second substrate.

Further, the preparation step S10 of the first and second substrates includes forming an alignment layer on the thin film transistor array substrate and the color filter substrate, respectively, and rubbing the surface of the alignment layer, and printing a seal pattern on the color filter substrate and forming spacers on the thin film transistor array substrate. Here, the seal pattern printing and spacer forming may be performed in reverse according to the operation condition. In addition, the above processes may be performed at the same time on either one of the substrates. The seal pattern together with spacers provides a gap for injecting liquid crystal material and prevents leakage of the liquid crystal inserted.

The substrate attaching step S20 is a step where the first and the second substrates are attached to each other with the sealant interposed between them. The attaching step S20 includes a press process where completely attaching the two substrates to each other by hardening sealants through the application of high pressure to the two substrates.

The substrate holding step S30 is a step where the attached two substrates according to S20 step are held by a vacuum chuck of a scribing apparatus. At this time, the vacuum chuck 20 of the scribing apparatus according to the present invention is bent to a predetermined radius of curvature as explained above. Therefore, if the substrate is fixed on the bent vacuum chuck 20 using a vacuum, as shown in FIG. 3, the substrate 10 is bent and tension is thus applied to a predetermined cutting surface 11 of the substrate.

Figure 1A:
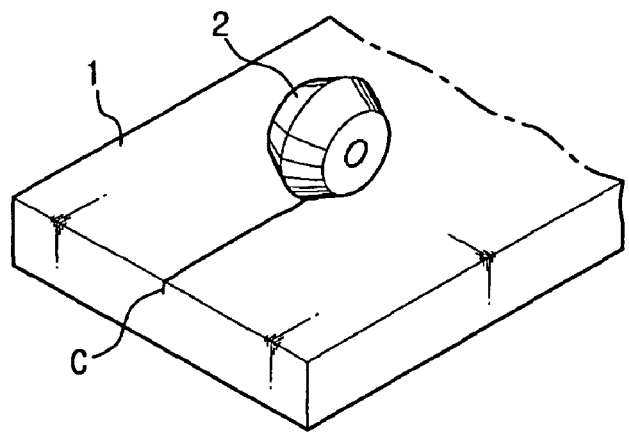
FIGS. 1A and 1B are drawings showing typical scribing process and breaking process of a liquid crystal panel, respectively.
Figure 1B:
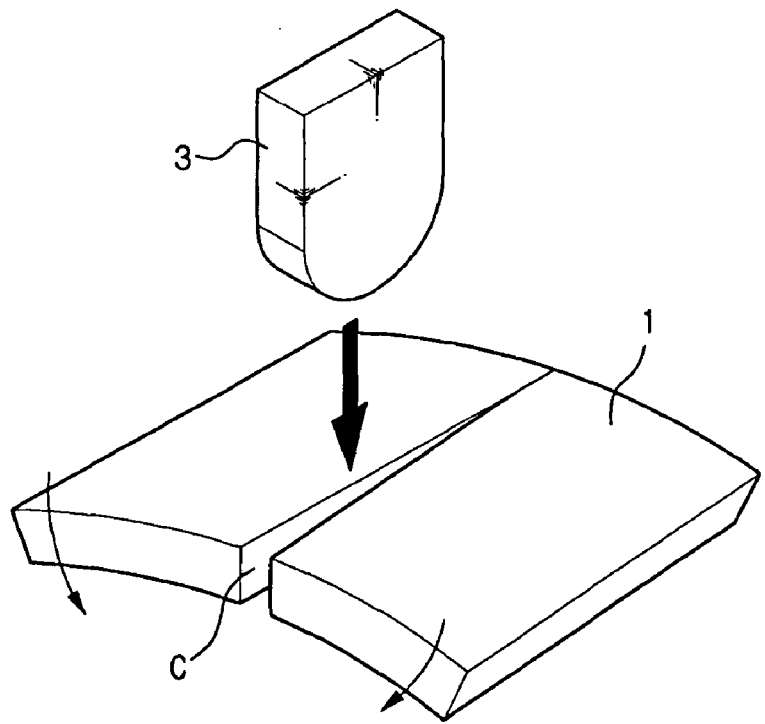
Figure 2:
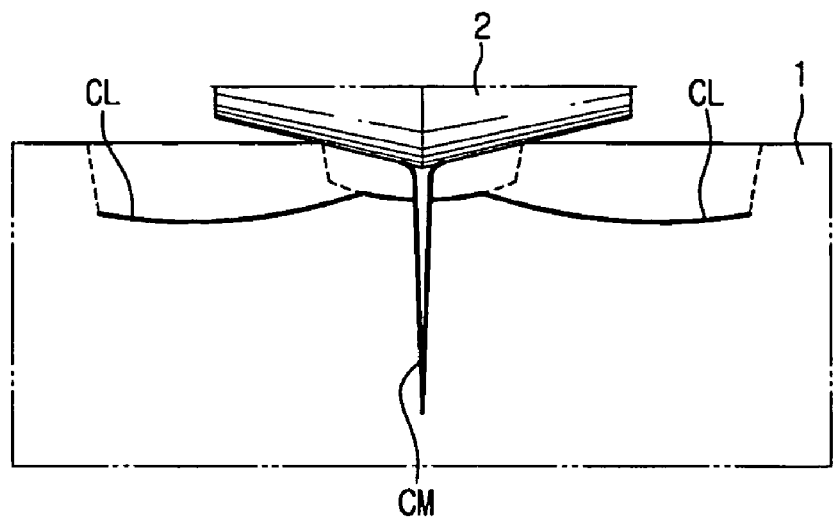
FIG. 2 is a drawing illustrating that a crack is generated at the time of a scribing process.

The scribing step S40 is, as shown in FIG. 3, a process for forming a crack C on the predetermined cutting surface of the substrate 10 using the scribing wheel 30. In a state where the scribing wheel 30 is pressed at a selected pressure, this step is performed by rotating the scribing wheel 30 simultaneously with the movement of the predetermined cutting surface 11 of the substrate from one side to the other. This process forms the crack C on the predetermined cutting surface 11 of the substrate. At this time, even though the median crack CM and lateral crack CL as described above in the prior art coexist (please refer to FIG. 2), thanks to the scribing according to the present invention the generation of lateral cracks may be remarkably decreased.

The breaking step S50 is a process of cutting the substrates by applying a mechanical force to the substrate where the cracks are already formed according to the scribing step, using a breaking bar, etc.

In the scribing step S40 and the breaking step S50 such as this, since in a state where the first and second substrates are attached, after the scribing process regarding the first substrate, the substrates are inverted to 180 degrees and the scribing of the second substrate is then performed. Subsequently, after the breaking process of the second substrate the substrates are inverted to 180 degrees again and the breaking of the first substrate is then performed. However, alternatively the second substrate may be scribed first whereas the first substrate undergoes breaking last.

Lastly, the liquid crystal injection step S60 is a process where liquid crystal is injected to each unit cell cut. The liquid crystal unit cell has a cell gap of several microns and as a method of injecting efficiently liquid crystal to such a structure of cell a vacuum injection method where a pressure difference between the inside and outside of cells is used.

According to the present invention described above, since the lateral cracks existing on the cutting surface of the substrate are remarkably reduced, the lowering of strength of the cutting surface of the substrate may be prevented. Accordingly, durability and reliability of the liquid crystal panel may be increased yet further.

For explaining the present invention more specifically, the present invention is to be explained based on exemplary embodiments shown in the appended drawings. The present invention is not restricted to those shown by these embodiments, but can be practiced in various modifications and variation without departing from the sprit or scope of the present invention. Thus, it is intended that the present invention cover the modifications and variations of the present invention provided they come within the scope of the appended claims and their equivalents.

What is claimed is:

1. A method of scribing a liquid crystal panel comprising:
   providing a substrate;
   bending the substrate into a predetermined radius of curvature; and
   then forming a crack on a surface of the bent substrate.

2. A method of scribing a liquid crystal panel comprising:
   providing a chuck having a first predetermined radius of curvature;
   providing a substrate;
   positioning the substrate on the chuck to bend the substrate into a second radius of curvature; and
   forming a crack on the bent surface of the substrate.

3. A method of fabricating a liquid crystal panel comprising:
   forming a crack on a surface of a substrate using a scribing wheel; and
   breaking the substrate by applying a mechanical force to the substrate,
   wherein the substrate is bent into a predetermined radius of curvature such that tension is applied to the surface when the crack is formed.

4. The method of claim 3, wherein the substrate is bent into a predetermined radius of curvature by affixing the substrate to a chuck having a radius of curvature equal to or greater than the predetermined radius of curvature.

5. The method of claim 4, wherein the predetermined radius of curvature is in the range of elastic deformation of the substrate.

6. A method of fabricating a liquid crystal panel comprising:
   providing a first substrate and a second substrate;
   adhering the first substrate to the second substrate with a predetermined space in between the first substrate and the second substrate;
   bending the adhered first and second substrates into a predetermined radius of curvature such that tension results in a surface of the first substrate;
   and then forming a first crack on the bent first substrate;
   bending the adhered first and second substrates into a predetermined radius of curvature such that tension results in a surface of the second substrate;
   and then forming a second crack on the bent second substrate;
   breaking the substrates by applying mechanical force to the surface of the first substrate and the surface of the second substrate on which the first crack and the second crack are formed.

7. The method of claim 6, wherein the first and second substrates are fixed to a vacuum chuck having the predetermined radius of curvature.

8. The method of claim 6, wherein the predetermined radius of curvature is in the range of elastic deformation of the substrate.

9. The method of scribing a liquid crystal display panel of claim 1, wherein the crack is formed on the substrate using a scribing wheel.

10. The method of scribing a liquid crystal display panel of claim 2, wherein the crack is formed on the substrate using a scribing wheel.

11. The method of scribing a liquid crystal display panel of claim 2, wherein the first radius of curvature and the second radius of curvature are the same.

12. The method of scribing a liquid crystal display panel of claim 1, wherein the predetermined radius of curvature is within the range of elastic deformation of the substrate.

13. The method of scribing a liquid crystal display panel of claim 2, wherein the second radius of curvature is within the range of elastic deformation of the substrate.

14. The method of claim 4, wherein the chuck is a vacuum chuck.

* * * * *